US006814770B2

(12) United States Patent
Lu et al.

(10) Patent No.: US 6,814,770 B2
(45) Date of Patent: Nov. 9, 2004

(54) VAPOR TRANSFERRING APPARATUS FOR PURIFICATION

(75) Inventors: Tien-Rong Lu, Tainan (TW); Jinna-Shyng Shiue, Yunghe (TW); Jih-Sheng Shiu, Hsinchu (TW)

(73) Assignee: Ritdisplay Corporation, Hsin Chu Industrial Park (TW)

( * ) Notice: Subject to any disclaimer, the term of this patent is extended or adjusted under 35 U.S.C. 154(b) by 35 days.

(21) Appl. No.: 10/285,130

(22) Filed: Nov. 1, 2002

(65) Prior Publication Data

US 2003/0136714 A1 Jul. 24, 2003

(30) Foreign Application Priority Data

Jan. 18, 2002 (TW) ...................................... 91200448 U

(51) Int. Cl.[7] .......................... B01D 46/00; B01D 50/00
(52) U.S. Cl. ......................... 55/385.2; 55/467.1; 96/421
(58) Field of Search ............................ 55/385.1, 385.2, 55/467, 467.1; 96/421

(56) References Cited

U.S. PATENT DOCUMENTS 4,741,882 A * 5/1988 Weichselgartner .......... 422/122
5,039,321 A * 8/1991 Satoh et al. .................. 96/361
5,730,765 A * 3/1998 Henry et al. .................. 96/420
5,827,339 A * 10/1998 Nagafune et al. .......... 55/350.1
6,168,085 B1 * 1/2001 Garcia ...................... 236/44 C
6,235,072 B1 * 5/2001 Kopylov et al. .............. 55/338
6,340,381 B1 * 1/2002 Fujii et al. ...................... 95/63
6,364,762 B1 * 4/2002 Kaveh et al. ............... 454/187
6,670,290 B2 * 12/2003 Kisakibaru et al. ......... 438/800
2001/0042439 A1 * 11/2001 Roberson et al. ................ 95/8
2002/0129707 A1 * 9/2002 Tanaka et al. ................ 95/273
2002/0178705 A1 * 12/2002 Mullins ..................... 55/385.2
2002/0194995 A1 * 12/2002 Shiramizu .................... 95/273

* cited by examiner

*Primary Examiner*—Robert H. Spitzer
(74) *Attorney, Agent, or Firm*—Bacon & Thomas, PLLC

(57) ABSTRACT

A vapor transferring apparatus for purification of organic functional materials is disclosed, which comprises a furnace having at least a furnace gate, furnace walls, and a heater; wherein the furnace gate is mounted on the furnace walls of the heater; at least a glove box having at least a box gate, box walls, and at least one glove; wherein the box gate is mounted on the box walls of the glove box; and a shifting chamber having at least a valve and at least a surrounding wall, locating between and connecting with the furnace gate of the furnace or the box gate of the glove box; wherein the valve is mounted on the surrounding wall of the shifting chamber; wherein the heater, the glove box, and the shifting chamber are hermetical and hollow.

11 Claims, 2 Drawing Sheets

VAPOR TRANSFERRING APPARATUS FOR PURIFICATION

BACKGROUND OF THE INVENTION

1. Field of the Invention

The present invention relates to a vapor transferring apparatus for purification and, more particularly, to a vapor transferring apparatus for purification of organic functional compounds.

2. Description of Related Art

In recent years, the organic light-emitting display device attract much attention because of several advantages such as flatness, high contrast, short response time, simple structure, light weight, wide viewing-angle, low power consumption, and high brightness. However, there are still many technical problems to be overcome for the mass-production of organic light-emitting display devices, especially to extend the lifetime of the organic light-emitting display devices.

Currently many research reports show that the main factors for destroying the luminance-function of the organic light-emitting display device are the moisture and the oxygen locates inside organic light-emitting display device. Since the functional medium (i.e. the organic functional materials) of the organic light-emitting display device is very sensitive to the moisture and the oxygen, the functional medium is easy to be broken as concentrations of moisture or oxygen rise. This is the main reason why the lifetime of the organic light-emitting device can't reach the commercial production standards (3,000 to 6,000 hr) Therefore, how to isolate the moisture and oxygen from the functional medium (i.e. the organic functional materials) in each step of manufacturing-process for organic light-emitting display device is a key factor to overcome the obstacle for commercial mass production of organic light-emitting display device.

The purity of the functional medium (i.e. the organic functional materials) of the organic light-emitting display device sold from the general market is not high enough for direct processing for the organic light-emitting display device. Most of the organic functional materials need to be purified or re-purified for removing oxygen and moisture for further mass-production steps. Basically, the purification is achieved through sublimation in order to separate and isolate impurities, the moisture and oxygen from the organic functional materials. Traditionally the purified organic materials are transported in gas phase and then condensed in a holder or clean pipes during sublimation. However, as the purified is collected, the holder or the pipes are taken out of the holder or chamber in vacuum or inert gas environment. Then the collection is achieved in the atmosphere, which means the purified organic functional materials are exposed to moisture and the oxygen again. Since the amounts of the mist and oxygen absorbed by the just purified organic functional materials are far below the saturation content of moisture or oxygen, the absorption of moisture or oxygen to these purified organic functional materials are much stronger and faster. Furthermore, a powdered-product is formed by the scraping in the collection step for the organic materials. In addition, the contact area on the surface of the organic materials with the moisture and oxygen also increases very much. This means that the volume and the rate for absorbing oxygen and moisture increase, too. Therefore, it needs a new method to prevent the exposure of the powder to the atmosphere. Furthermore, the scraping may cause the flying of the organic dusts having carcinogenic aromatic groups. It is harmful to the health of human body. Therefore, it also needs a sealed room for separating the operators and the dusts and thus providing a safer environment for operation.

Therefore, it is desirable to provide an improved method to mitigate and/or obviate the aforementioned problems.

SUMMARY OF THE INVENTION

The object of the present invention is to provide a vapor transferring apparatus for purifying and isolating the organic functional materials from the moisture and oxygen in the air and providing highly purified organic functional materials for the mass-production of the organic light-emitting display devices.

The other object of the present invention is to provide a sealed vapor transferring apparatus for separating the operators from the powders of the organic functional materials and ensuring the health of the operators.

To achieve the object, the vapor transferring apparatus for purification of the present invention comprises a furnace chamber having at least a furnace gate, furnace walls, and a heater; wherein said furnace gate is mounted on said furnace walls of said furnace chamber; at least a glove box having at least a box gate, box walls, and at least one glove; wherein said box gate is mounted on said box walls of said glove box, said gloves are mounted on at least one glove box; and a shifting chamber having at least a valve and at least a surrounding wall, locating between and connecting with said furnace gate of said furnace chamber or said box gate of said glove box; wherein said valve is mounted on said surrounding wall of said shifting chamber; wherein said furnace chamber, said glove box, and said shifting chamber individually has a hollow space.

Other objects, advantages, and novel features of the invention will become more apparent from the following detailed description when taken in conjunction with the accompanying drawings.

DETAILED DESCRIPTION OF THE PREFERRED EMBODIMENT

The present invention comprises a platform, on which a sublimation furnace, at least a glove box, at least a shifting chamber, an inert gas-supplying cabin, and at least an exhaust pump are installed. The purification of the non-purified samples by evaporation transportation is carried out in the sublimation furnace having a heater and is well sealed. The sublimation furnace is connecting with and next to the glove box where the purified samples are collected. Before the heating for sublimation is processed, the holding pipes carrying the samples are put into the sublimation furnace. After the heating, the holding pipes are passed through the connecting pipes to the glove box for collecting. The glove box of the present invention is a hermetically hollow chamber. Basically, the material of the box walls of the present invention is not limited. Preferably, at least one of the box walls is transparent. The positions of the gloves of the glove box are not limited. Preferably, the gloves locate on the box walls. The material of the glove is not limited. Preferably, the glove is made of plastic or rubber. In the present invention one side of the glove box is hermetically connecting with and next to the shifting chamber that is hollow, and the other side is selectively connecting with or next to the gas-supplying cabin. The gas-supplying cabin is used for the reserve of the operation appliances or the uses of spare space in order to facilitate the process operation. The inert gas is selectively introduced into the glove box or the sublimation furnace to form an inert atmosphere. The inert gas can be any conventional inert gas. Preferably, it is nitrogen. Furthermore, the number of the glove box is not limited. Preferably, there are two glove boxes. The vapor transferring apparatus for purification of the present invention can selectively further comprise at least an exhaust pump for the exhaust and pressure-release of the sublimation furnace, the glove box, or the gas-supplying cabin. Also the vapor transferring apparatus for purification of the present invention can selectively further include a pressure gauge for detecting the pressure variation during the processing and a water-oxygen absorption or filtering device for controlling the content in the atmosphere.

Figure 1:
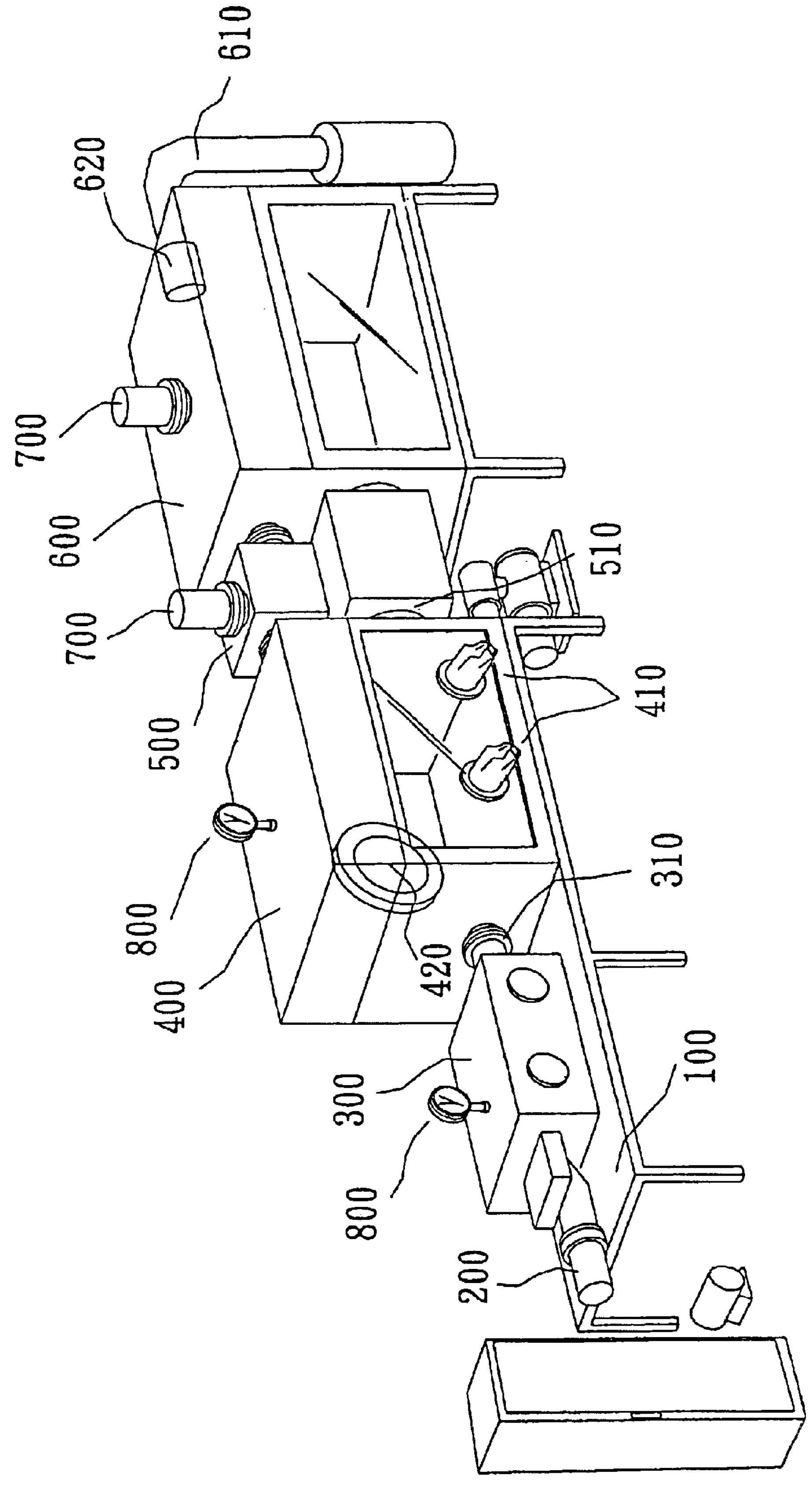
FIG. 1 is a perspective view of the preferred embodiment of the vapor transferring apparatus for purification according to the present invention.

With reference to FIG. 1, there is shown a perspective view of the preferred embodiment of the vapor transferring apparatus for purification according to the present invention. The vapor transferring apparatus for purification of the present comprises a platform 100, on which a sublimation furnace 300, a glove box 400, a shifting chamber 500, an inert gas-supplying cabin 600, and an exhaust pump 700 are installed. The sublimation furnace 300 is a hermetical chamber inside which a heater is provided for achieving suitable conditions for the evaporation transportation purification of organic functional materials. The sublimation furnace 300 has an opening valve 310 through which the sublimation furnace 300 is connected with the glove box 400. A holding pipe 200 carried with the organic functional materials samples is put into the sublimation furnace 300 for purification. After the sublimation is finished, the holding pipe 200 is then further moved to the glove box 400. In the preferred embodiment the glove box 400 is a sealed hollow chamber with transparent box walls where plastic gloves 410 (or a rubber glove) are mounted. The glove box 400 has an isolation valve 510, which is hermetically connected with one side of the shifting chamber 500, and the other side of the shifting chamber 500 is hermetically connected with the inert gas-supplying cabin 600. In this preferred embodiment, in addition to the gas-supplying cabin 600 and the inert gas supplier 610 for providing nitrogen to form an inert atmosphere, a plurality of water-oxygen absorption and filtering devices 620 are also mounted in the glove box 400, and the sublimation furnace 300 for isolating the moisture and oxygen from the purified organic functional materials. The preferred embodiment of the vapor transferring apparatus for purification further comprises an exhaust pump 700 for the exhaust and for releasing the gas of each chamber. Preferably, two more pressure gauges 800 are installed on the sublimation furnace 300 and the glove box 400 for monitoring the pressure variation thereof. Additionally, an opening 420 for entrance and a cover for closing the opening can be found on one sidewall of the glove box 400 for providing a channel of the entrance or exit of operators or machines for repairing or maintenance.

Before starting purification and collection processing of the present invention, the inert gas such as nitrogen is introduced into the glove box for removing the moisture and the oxygen. The purification of evaporation transportation, for example, sublimation is on processing, the sample of organic functional material is put into a sample-boat. Then the sample-boat is placed in the holding pipe, which is then arranged in the sublimation furnace of the vapor transferring apparatus for purification composed of all the elements mentioned above. The air in the apparatus is excluded out gradually by filling with nitrogen. During the purification, the holding pipe is heated in the sublimation furnace. The pure materials in the sample then are evaporated and further diffuse toward the collecting pipes locating at the two ends of the holding pipe by the assistance of diffusion or laminar flow. The pressure of the inner space of the furnace can be selectively controlled to form a lower pressure atmosphere to help the achievement of the sublimation and facilitate the purification. After the heating of the purification is finished, the operator can collect the purified organic functional materials by the operation of his hands in the gloves of the glove box. In this hand-collecting stage, the holding pipe is passed to the glove box and then the purified organic functional material condensed on the pipe wall is scraped. Since the passing and the collection of the organic functional material is carried out in the inert gas environment of the chamber, the moisture and oxygen in the air can be isolated to prevent damage to the purified organic functional material. Moreover, the isolated apparatus can also protect the operators from inhaling or touching the dusts of the organic functional materials. In addition, the pressure gauges also can help to monitor the change of the pressure in the purification process.

Figure 2:
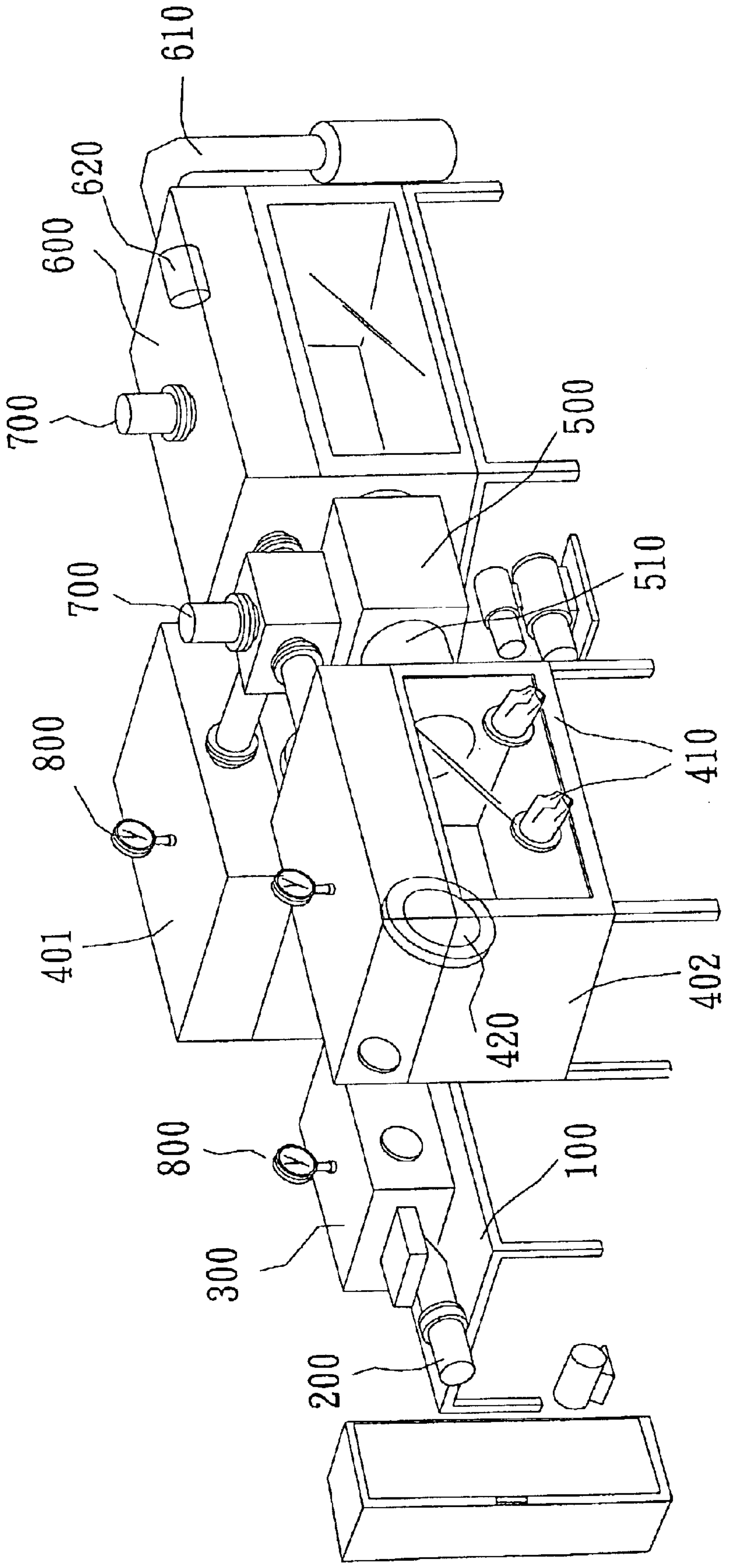
FIG. 2 is a top view of another preferred embodiment of the vapor transferring apparatus for purification according to the present invention.

With reference to FIG. 2, there is shown another preferred embodiment of the present invention. The structure of the embodiment is approximately the same with that of the first embodiment. However, there are two glove boxes 401, 402 in the apparatus of the present embodiment. The sublimation furnace 300 connects with the glove boxes 401, 402 by its opening valves. The shifting chamber 500 connects with the inert gas-supplying cabin 600 at one side and with the glove boxes 401, 402 at the other two sides. Since there are two glove boxes in the apparatus of the second embodiment, one glove can be on operation as the other one is repaired or cleaned. This means that the purification can be operated all the time since at least one glove box is ready for purification all the time. Of course, the moisture and oxygen in the air can be isolated from the purified organic functional material.

Although the present invention has been explained in relation to its preferred embodiment, it is to be understood that many other possible modifications and variations can be made without departing from the spirit and scope of the invention as hereinafter claimed.

What is claimed is:

1. A vapor transferring apparatus for purification of organic functional materials, comprising:

a furnace chamber having at least a furnace gate, furnace walls, and a heater; wherein said furnace gate is mounted on said furnace walls of said furnace chamber;

at least a glove box having at least a box gate, box walls, and at least one glove; wherein said box gate is mounted on said box walls of said glove box, said glove is mounted on at least one glove box; and a shifting chamber having at least a valve and at least a surrounding wall, locating between and connecting with said furnace gate of said furnace chamber or said box gate of said glove box; wherein said valve is mounted on said surrounding wall of said shifting chamber;

wherein said furnace chamber, said glove box, and said shifting chamber individually has a hollow space.

2. The apparatus as claimed in claim 1, further comprising at least a gas-supplying cabin having at least a cabin door and a cabin wall for filling inert gas; wherein said cabin door is mounted on said cabin wall of said gas-supplying cabin, said cabin door locates next to and connects with said valve of said shifting chamber and said box gate of said glove box.

3. The apparatus as claimed in claim 2, wherein at least one of said box walls of said glove box is transparent.

4. The apparatus as claimed in claim 2, wherein said apparatus comprises two said glove boxes.

5. The apparatus as claimed in claim 2, wherein said box walls of said glove box have an opening and a cover; wherein said cover exactly seals said opening of said box walls and said opening doesn't connect with or locate next to said valve of said shifting chamber.

6. The apparatus as claimed in claim 2, wherein said inert gas is nitrogen.

7. The apparatus as claimed in claim 2, further comprising at least one inert gas supplier.

8. The apparatus as claimed in claim 2, wherein said glove is made of rubber or plastic.

9. The apparatus as claimed in claim 2, further comprising a pressure gauge.

10. The apparatus as claimed in claim 2, further comprising a water-oxygen absorption or filtering device.

11. The apparatus as claimed in claim 1, further comprising at least an exhausting pump for vacuuming out gas.

* * * * *